Nov. 11, 1969         M. J. DUER         3,477,312
LIMITED SLIP DIFFERENTIAL WITH ANTICHATTER CLUTCH
Filed April 12, 1968         2 Sheets-Sheet 1

INVENTOR.
Morris J. Duer
BY
Robert J. Outland
ATTORNEY

Nov. 11, 1969  M. J. DUER  3,477,312
LIMITED SLIP DIFFERENTIAL WITH ANTICHATTER CLUTCH
Filed April 12, 1968  2 Sheets-Sheet 2

INVENTOR.
Morris J. Duer
BY
Robert J. Outland
ATTORNEY

United States Patent Office
3,477,312
Patented Nov. 11, 1969

3,477,312
LIMITED SLIP DIFFERENTIAL WITH ANTICHATTER CLUTCH
Morris J. Duer, Lansing, Mich., assignor to General Motors Corporation, Detroit, Mich., a corporation of Delaware
Filed Apr. 12, 1968, Ser. No. 720,860
Int. Cl. F16h 1/44
U.S. Cl. 74—711          10 Claims

ABSTRACT OF THE DISCLOSURE

A limited slip differential having, in preferred embodiments, multiple plate clutch packs arranged between the side gears and the casing so as to resist differential action. In each pack, two groups of alternate plates are arranged such that the plates of one group are nonresiliently connected to one of two relatively rotatable members and the plates of the other group are connected with varying degrees of torsional resilience to the other of the two members such that the beginnings and endings of relative movement between the various plates of each clutch pack occur sequentially, reducing physical shock and eliminating or diminishing observable chatter in the differential mechanism.

FIELD OF THE INVENTION

This invention relates to limited slip differentials for automotive vehicles and, more particularly, to antichatter clutch means for use in such differentials.

DESCRIPTION OF THE PRIOR ART

It is known in the art relating to automotive vehicle drives to utilize limited slip differentials having clutch means arranged to frictionally resist differential action. Such arrangements change the normal differential action so that a greater percentage of driving torque may be delivered to a wheel having traction when the other driving wheel has lost traction on a slippery surface, such as ice or snow.

Among the limited slip differentials which have been widely used are those in which clutch means between the differential casing and the side gears are loaded through the separating force of the pinion gears acting on the side gears in response to the delivery of driving torque through the differential unit. The clutch means may alternately be loaded by resilient devices such as springs or by a combination of preload springs supplemented by torque loading. Limited slip differentials of this type have been satisfactorily used in many commercial applications. However, it has been necessary to carefully select the type of clutch and the differential lubricant used in order to minimize chatter which is noticeable under certain conditions in the vehicle compartment to the annoyance of the driver.

Studies of the chatter phenomenon in limited slip differentials have indicated that the problem is the result of alternate stick-slip action of the clutch elements which occurs during differential action, particularly under conditions of low speeds of relative rotation between the driving axles. This alternate sticking and slipping of the clutch elements results in a series of physical shocks which are transmitted through the drive gear to the vehicle body, resulting in audible chatter.

SUMMARY OF THE INVENTION

The present invention provides a limited slip differential arrangement having one or more multiplate clutch packs arranged to reduce or eliminate observable chatter. The clutch packs are formed of two groups of alternately arranged plates in which the plates of one group are connected to their driving or driven member, as the case may be, with varying degrees of torsional resilience.

In this way, the beginning and ending of movement between the plates of the clutch pack occurs in a sequential manner, spreading out the stick-slip action of the various plates of each pack and dividing the physical shock into a number of much smaller shock forces. In this way, observable chatter is reduced or eliminated from the differential assembly.

Further features and advantages of the invention will be apparent from the following description of certain preferred embodiments of the invention taken together with the accompanying drawings.

DESCRIPTION OF THE PREFERRED EMBODIMENTS

Figure 1:
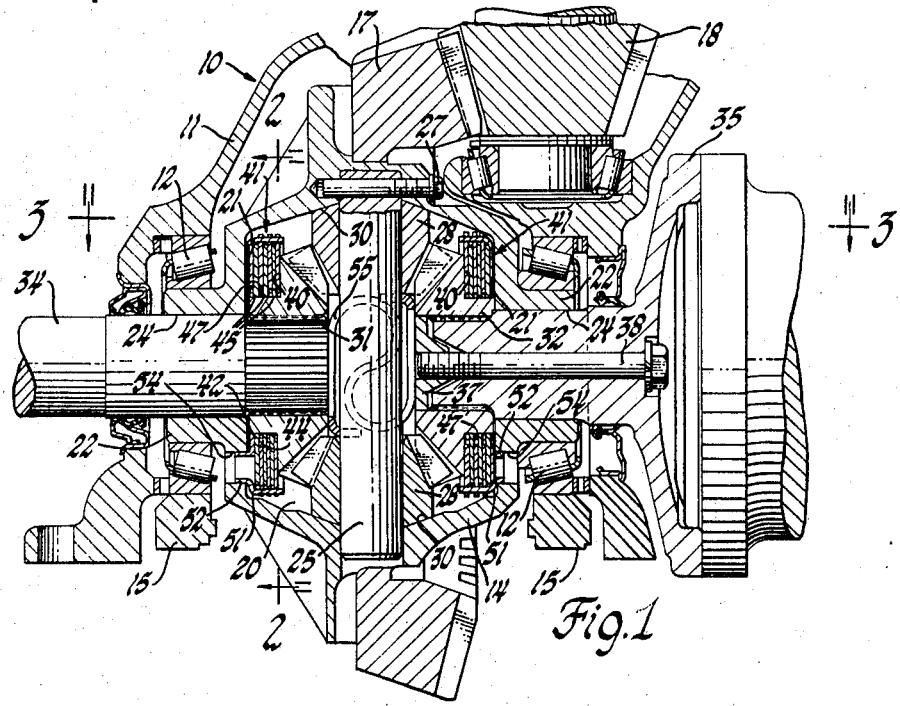
FIGURE 1 is a cross-sectional view of one embodiment of a limited slip differential arranged according to the invention.
Figures 2, 3:
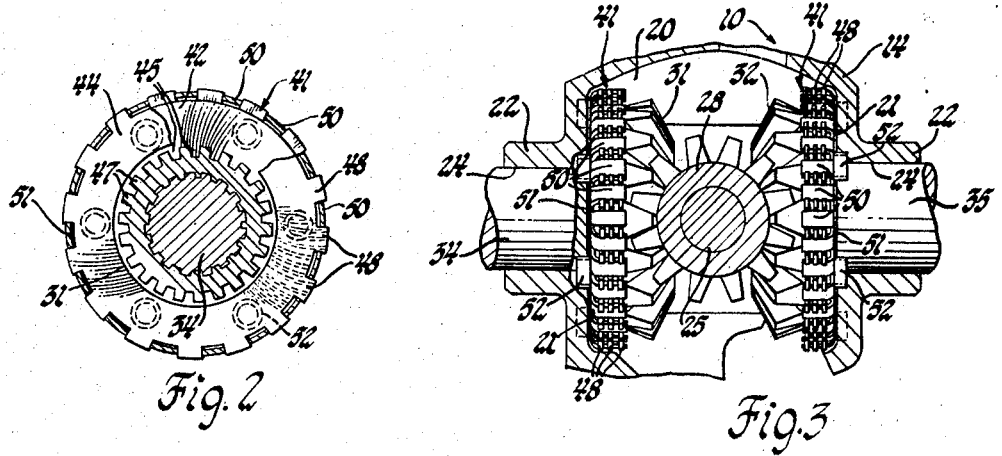
FIGURE 2 is a cross-sectional view taken generally along the plane indicated by the line 2—2 of FIGURE 1 and showing one of the multiplate clutch packs.
FIGURE 3 is a cross-sectional view taken generally in the plane indicated by the line 3—3 of FIGURE 1 and showing the clutch packs in side elevation.
Figure 4:
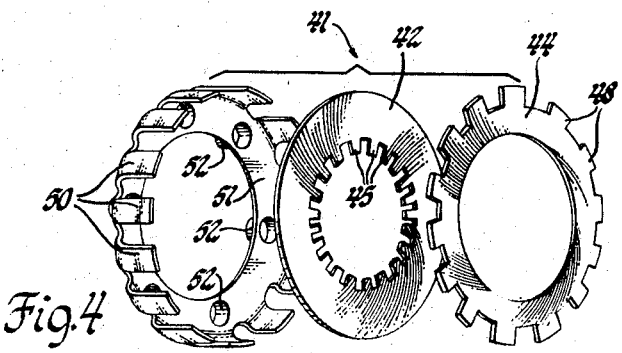
FIGURE 4 is a pictorial view illustrating the form of the clutch pack plates and the anchor member used therewith.

Referring now to the drawings in detail, numeral 10 generally indicates a preferred embodiment of a limited slip differential having portions illustrated in FIGURES 1 through 4. Differential 10 includes a housing 11 supporting in bearings 12 a differential casing 14. The bearings are retained by removable retainers 15. Casing 14 carries a ring gear 17 which is engaged by a drive pinion 18 rotatably caried in the housing 11 and connectable with the engine of a vehicle for the purpose of rotatably driving the differential casing 14.

Casing 14 includes a central portion defining a cavity 20 and having a pair of oppositely disposed annular end walls 21. Adjacent the end walls are extending journals 22 carried in the bearings 12 and having member receiving openings 24. Casing 14 also carries a pin 25 extending transversely across cavity 20 and retained by a screw 27. Pin 25 rotatably carries a pair of pinion gears 28 which bear against seats 30 formed on the casing wall.

Pinion gears 28 drivingly engage a pair of side gears 31 and 32. Side gear 31 is splinedly connected to a drive shaft output member 34 which is received in one of the openings 24 of the casing for driving a vehicle wheel (not shown). Side gear 32 is splinedly connected to an output member 35 which extends through the other opening 24 and outboard of the differential mechanism for driving another vehicle wheel (not shown). Member 35 is secured to side gear 32 by means of a retainer 37 which is pressed into the side gear and threadably receives a bolt 38 extending transversely in member 35.

Mounted between the outer faces 40 of the side gears 31, 32 and the end walls 21 of the casing are a pair of clutch packs generally indicated by numeral 41. Clutch packs 41 are made up of two groups of alternately arranged friction plates 42 and 44, respectively, held in frictional engagement. Clutch plates 42 include teeth 45 located on their inner peripheries which engage splines 47 formed on the side gears 31, 32 so as to rotatably lock plates 42 to the side gears and to their respective output members for rotation therewith. Clutch plates 44 include teeth 48 around their outer peripheries which engage axially extending torsionally resilient tangs 50 of an annularly shaped sheet metal anchor member 51 disposed between each clutch pack and the respective end wall 21. Anchor members 51 are nonrotatably fixed to the casing 14 by protruding portions 52 which are received in openings 54 formed in the end walls 21.

The clutch packs are preloaded in frictional engagement by means of a deformed leaf spring 55 which bears against the inner surfaces of side gears 31, 32, urging them outwardly.

In operation, rotation of pinion gear 18 drivingly rotates ring gear 17 and casing 14, causing the orbiting of pinion gears 28 and the consequent rotation of side gears 31, 32 and their respective output members 34, 35. Relative rotation of output members 34, 35 is resisted by the friction developed in the clutch packs 41 which tend to lock the output members to the casing 14. This locking force depends, in part, upon the preloading of leaf spring 55 but is increased by the separating force caused by the transmission of torque from pinion gears 28 to the side gears 31, 32. Nevertheless, the locking force remains sufficiently low to permit differential action when relative rotation of the vehicle wheels is required, such as when turning a corner.

Such differential action causes side gears 31, 32 to rotate in opposite directions at equal speeds with respect to casing 14. The pinion gears 28 are, of course, also rotated on the pin 25. Rotation of the side gears causes plates 42 to slide between plates 44 which, especially at low speeds of relative rotation, may result in an alternate sticking and slipping of the clutch plates with respect to one another.

Due to the resilient action of tangs 50 of the anchor member 51, the various clutch plates 44 of each clutch pack 41 are connected to the casing 14 with varying degrees of torsional resilience. This is due to the fact that the plates 44 engage tangs 50 at various distances from their points of retention to the anchor member 51. Thus the plates 44 closest to walls 21 are less resiliently connected to the casing than are the plates 44 further away from the walls 21. Therefore, upon the initiation of movement between the side gears and casing, the more solidly connected outboard plates 44 will first break free while the more resiliently connected inner plates 44 will each move resiliently an increasing distance before relative movement with the gear connected plates 42 occurs. In this way, sequential action of the beginning and ending of relative rotation between the various plates of each clutch pack occurs, thus dividing the shock load into a series of smaller loads and reducing or eliminating any chatter effect.

Figure 5:
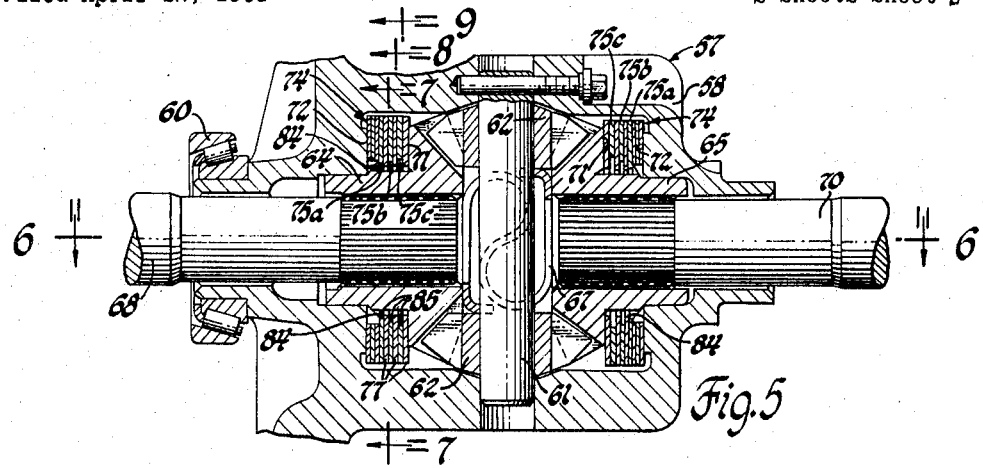
FIGURE 5 is a cross-sectional view of another form of differential disclosing an alternative arrangement of clutch means according to the invention.
Figure 7:
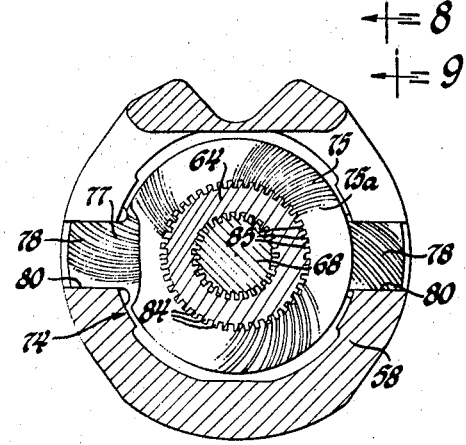
FIGURES 7, 8 and 9 are cross-sectional views taken in the planes indicated by the lines 7—7, 8—8 and 9—9, respectively, of FIGURE 5 and showing the forms of various resiliently connected plate members of one of the clutch packs.
Figure 6:
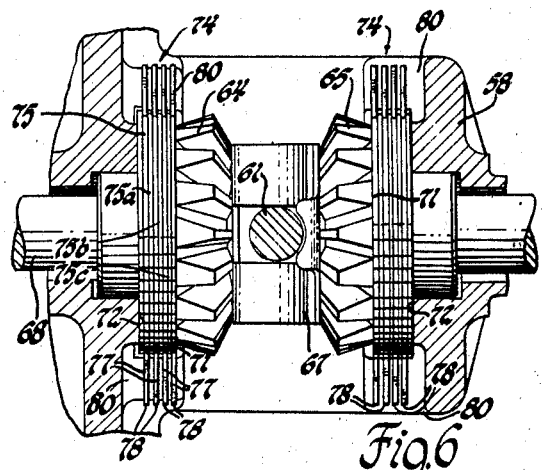
FIGURE 6 is a cross-sectional view taken generally in the plane indicated by the line 6—6 of FIGURE 5 and showing the clutch packs thereof in side elevation.
Figure 8:
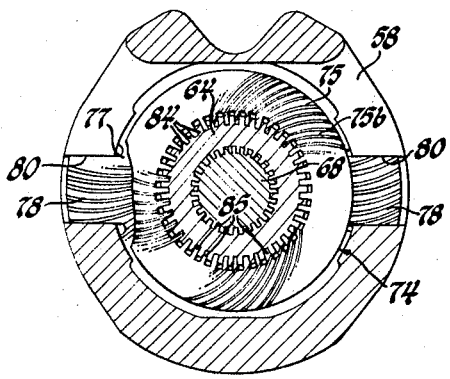
Figure 9:
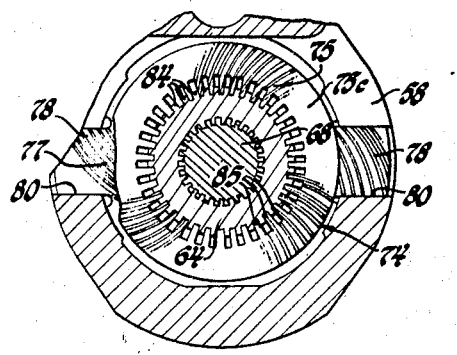

Referring now to FIGURES 5 through 9, there is shown an alternative embodiment of a differential arrangement having a varied form of clutch means according to the invention. The differential arrangement of FIGURES 5 through 9 is arranged for use with the more conventional, so-called "solid driving axle," whereas, the arrangement of FIGURES 1 through 4 is intended for use with an independently suspended drive axle arrangement. However, it should be noted that the differing clutch arrangements of the two embodiments could be applied to either type of differential arrangement and thus are not limited to the specific embodiments shown.

In FIGURES 5 through 9 certain elements of the differential construction, generally indicated by numeral 57, have been deleted for simplicity. These include the housing, the pinion gear, ring gear and bearing retainers which are conventional in design. The portion shown includes a casing 58 rotatably carried on bearings, such as 60, and retaining a transverse pin 61, pinion gears 62, side gears 64, 65 and preload spring 67 which are generally arranged within the casing 58 in the same manner and for the same purpose as the like components of FIGURE 1. Side gears 64 and 65 are splined to output members comprising axle shafts 68 and 70 which are connected to separate drive wheels (not shown) of a vehicle.

Between the annular outer surfaces 71 of the side gears and the annular end walls 72 of the casing 58 are located a pair of clutch packs generally indicated by numeral 74. Clutch packs 74 are each made up of two groups of alternately arranged friction plates 75 and 77, respectively. Plates 77 have extending from their outer edges, oppositely disposed tangs 78 which are received in slots 80 of the casing 58 so as to nonresiliently retain plates 77 within the casing. The groups of plates 75 include three different members: 75a, 75b and 75c, each connected to splines 84 of its respective side gear. All the plates 75 have teeth 85 along their inner peripheries which engage the splines 84 but the lengths of the teeth differ. Those of plates 75a are short and relatively stiff while those of plates 75b are longer and more flexible. Those of plates 75c are still longer than those of plates 75b and accordingly are more resilient. In this way, the plates 75 of each clutch pack are connected to their respective output member with varying degrees of resilience.

The operation of the embodiment of FIGURES 5 through 9 is very similar to that of FIGURES 1 through 4 except that in the FIGURE 5 through 9 embodiment, the resiliently connected plates are connected with the output members rather than with the casing as in the first described embodiment. Nevertheless, the break away action of the plates is similar in both instances and results in a sequential starting and stopping of relative motion between the various plates due to differential action of the differential mechanism. This spreads out and reduces the shock forces caused by the stick-slip characteristics in the same manner as does the action of the first embodiment and observable chatter is reduced or eliminated accordingly.

While the invention has been described by reference to two differing embodiments described in detail, it should be apparent that the inventive concepts involved could be equally well applied to a great variety of limited slip differential constructions and with many mechanical variations. Accordingly, it is desired that the scope of the invention not be limited by the specific disclosures hereof but that it be given a scope consistent with the language of the following claims.

I claim:

1. A limited slip differential mechanism of the type having
    a rotatable casing
    a pair of output members rotatably received in said casing and adapted to be driven thereby,
    a gear train comprising intermeshing gears rotatably carried in said casing and interconnecting said output members and said casing for rotation together such that rotation of said output members relative to one another causes rotation of said gear train relative to said casing, and
    the improvement comprising multiple element clutch means arranged to frictionally connect two relatively rotatable parts of said differential mechanism so as to resist relative rotation of said output members, said clutch means comprising a plurality of frictionally engaged elements arranged alternately in two groups, means nonresiliently connecting the elements of one of said groups to one of said relatively rotatable parts for rotation therewith, and means connecting with varying degrees of torsional resilience the elements of the other of said groups to the other of said relatively rotatable parts for rotation therewith, whereby, upon relative movement of said groups of clutch elements in response to relative rotation of said output members, the beginning and ending of relative rotation between the various clutch elements of said two groups occurs sequentially so as to substantially reduce observable chatter due to stick-slip action of the clutch means.

2. The differential mechanism of claim 1 wherein said clutch elements comprise annular friction plates arranged in a pack and said torsionally resilient connecting means comprise an anchor member disposed at one end of said pack and retaining a plurality of resilient tangs which extend axially along the pack, said tangs retainingly engaging the plates of the resiliently connected group at various distances from the retained end of said tangs so as to connect the various plates of said pack to said other rotatable part with varying degrees of torsional resilience.

3. The differential mechanism of claim 1 wherein said clutch elements comprise annular friction plates arranged in a pack and said torsionally resilient connecting means comprise a plurality of resilient teeth extending from one edge of each plate of the resiliently connected group.

4. The differential mechanism of claim 3 wherein the teeth of at least some of the resiliently connected plates differ in length from the teeth of the remaining plates to provide different degrees of torsional resilience between the teeth of the various plates.

5. A limited slip differential mechanism of the type having a rotatable casing, a pair of output members rotatably received in said casing and adapted to be driven thereby, a gear train including a pair of side gears, one connected with each of said output members, and a plurality of pinion gears intermeshing with said side gears and rotatably secured to said casing, said gear train being arranged to interconnect said output members and said casing for rotation together such that rotation of said output members relative to one another causes rotation of said side gears and said pinion gears relative to said casing, and the improvement comprising multiple plate clutch means arranged between one of said side gears and said casing to frictionally resist rotation of said gear train, said clutch means comprising a pack of frictionally engaged annular clutch plates arranged alternately in two groups, means nonresiliently connecting the plates of one of said groups with one of two relatively rotatable parts consisting of said casing and one of said output members for rotation therewith, and means connecting with varying degrees of torsional resilience the plates of the other of said groups with the other of said two relatively rotatable parts for rotation therewith, whereby, upon relative movement of said groups of clutch plates in response to relative rotation of said output members, the beginning and ending of relative rotation between the various clutch plates of said two groups occurs sequentially so as to substantially reduce observable chatter due to stick-slip action of the clutch means.

6. The differential mechanism of claim 5 wherein said torsionally resilient connecting means comprise an anchor member disposed at one end of said pack and retaining a plurality of resilient tangs which extend axially along the pack, said tangs retainingly engaging the plates of the resiliently connected group at various distances from the retained end of said tangs so as to connect the various plates of said pack to said other relatively rotatable part with varying degrees of torsional resilience.

7. The differential mechanism of claim 6 wherein said anchor member is nonrotatably connected to said casing such that the plates of said one group are nonresiliently connected with said one output member and the plates of said other group are connected with varying degrees of torsional resilience to said casing.

8. The differential mechanism of claim 5 wherein said torsionally resilient connecting means comprise a plurality of resilient teeth extending from one edge of each plate of the resiliently connected group.

9. The differential mechanism of claim 8 wherein said resilient teeth extend from the inner edges of their respective plates into engagement with spline means fixed to said one output member to resiliently connect the plates of said other group to said one output member, the plates of said one group being nonresiliently connected to said casing.

10. The differential mechanism of claim 9 wherein the teeth of at least some of the resiliently connected plates differ in length from the teeth of the remaining plates to provide different degrees of torsional resilience between the teeth of the various plates.

References Cited

UNITED STATES PATENTS

| | | | |
|---|---|---|---|
| 2,971,404 | 2/1961 | Thornton | 74—711 |
| 3,052,137 | 9/1962 | Russell | 74—710.5 |
| 3,208,306 | 9/1965 | Lewis | 74—711 |
| 3,326,064 | 6/1967 | Ordorica | 74—711 |
| 3,361,009 | 1/1968 | Wojcikowski | 74—711 |

ARTHUR T. McKEON, Primary Examiner

U.S. Cl. X.R.

192—70.2